US006946015B2

(12) United States Patent
Jorgensen et al.

(10) Patent No.: US 6,946,015 B2
(45) Date of Patent: Sep. 20, 2005

(54) CROSS-LINKED POLYBENZIMIDAZOLE MEMBRANE FOR GAS SEPARATION

(75) Inventors: Betty S. Jorgensen, Jemez Springs, NM (US); Jennifer S. Young, Los Alamos, NM (US); Brent F. Espinoza, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 189 days.

(21) Appl. No.: 10/607,589

(22) Filed: Jun. 26, 2003

(65) Prior Publication Data

US 2004/0261616 A1 Dec. 30, 2004

(51) Int. Cl.[7] .......................... B01D 53/22; B01D 71/58

(52) U.S. Cl. ....................... 95/51; 95/55; 96/13; 96/14; 55/524

(58) Field of Search ............................... 95/45, 47, 51, 95/55; 96/4, 12–14; 55/524, DIG. 5

(56) References Cited

U.S. PATENT DOCUMENTS

| | | | | | |
|---|---|---|---|---|---|
| 2,895,948 | A | | 7/1959 | Brinker et al. | 260/78.4 |
| RE26,065 | E | | 7/1966 | Marvel et al. | 260/47 |
| 3,699,038 | A | | 10/1972 | Boom | 210/23 |
| 3,720,607 | A | | 3/1973 | Brinegar | 210/23 |
| 3,737,042 | A | | 6/1973 | Boom | 210/321 |
| 3,822,202 | A | | 7/1974 | Hoehn | 210/23 |
| 3,932,542 | A | * | 1/1976 | Gerns | 570/206 |
| 4,005,053 | A | * | 1/1977 | Briggs et al. | 523/334 |
| 4,020,142 | A | | 4/1977 | Davis et al. | 264/347 |
| 4,154,919 | A | | 5/1979 | Sheratte | 528/186 |
| 4,263,245 | A | * | 4/1981 | Tan | 264/184 |
| 4,431,796 | A | * | 2/1984 | Choe et al. | 528/336 |
| 4,448,687 | A | | 5/1984 | Wang | 210/500 |
| 4,448,954 | A | * | 5/1984 | Choe et al. | 528/207 |
| 4,448,955 | A | * | 5/1984 | Choe et al. | 528/207 |
| 4,452,967 | A | * | 6/1984 | Conciatori et al. | 528/207 |
| 4,452,971 | A | * | 6/1984 | Choe et al. | 528/336 |
| 4,933,083 | A | | 6/1990 | Jones, Jr. | 210/490 |
| 5,034,026 | A | * | 7/1991 | Summers et al. | 95/47 |
| 5,232,574 | A | * | 8/1993 | Saika et al. | 204/418 |
| 5,612,478 | A | * | 3/1997 | Xu et al. | 540/474 |
| 5,618,332 | A | * | 4/1997 | Ekiner et al. | 95/51 |
| 5,679,133 | A | * | 10/1997 | Moll et al. | 95/45 |
| 6,489,052 | B1 | * | 12/2002 | Acker | 429/40 |
| 6,681,648 | B1 | * | 1/2004 | Dye et al. | 73/866 |
| 2002/0006757 | A1 | * | 1/2002 | Wyss | 442/181 |
| 2003/0134286 | A1 | * | 7/2003 | Edwards et al. | 435/6 |

OTHER PUBLICATIONS

J. S. Young, B. S. Jorgensen, B. F. Espinoza, M. W. Weimer, G. D. Jarvinen, Christopher J. Orme, Alan K. Wertsching, Eric S. Peterson, Vivek Khare, Alan R. Greenberg, and Scott Hopkins, Polymeric–Metallic Composite Membranes for High–Temperature Applications, pp. 1–7, published Nov. (2001).

Herward Vogel and C. S. Marvel, "Polybenzimidazoles, New Thermally Stable Polymers," Journal of Polymer Science, vol. L, pp. 511–639, (1961).

Herward Vogel and C. S. Marvel, "Polybenzimidazoles II," Journal of Polymer Science, Part A, vol. 1, pp. 1531–1541, (1963).

Robert C. Dye et al., "Meniscus Membranes for Separations," U.S. Appl. No. 09/826,484, filed Apr. 4, 2001.

Lloyd M. Robeson, "Correlation of Separation Factor Versus Permeability for Polymeric Membranes," Journal of Membranes Science, vol. 62, pp. 165–185, (1991).

M. E. Rezac and W. J. Koros, "Preparation of Polymer–Ceramic Composite Membranes with Thin Defect–Free Separating Layers," Journal of Applied Polymer Science, vol. 46, pp. 1927–1938, (1992).

W. J. Koros and G. K. Fleming, "Membranes–Based Gas Separation," Journal of Membranes Science, vol. 83, pp. 1–80, (1993).

Hidetoshi Kita, Tetsuya Inada, Kazuhiro Tanaka, and Ken–ichi Okamoto, "Effect of Photocrosslinking of Permeability and Permselectivity of Gases Through Benzophenone–Containing Polyimide," Journal of Membrane Science, vol. 87, pp. 139–147, (1994).

May–Britt Hägg, "Membranes in Chemical Processing A Review of Applications and Novel Developments," Separation and Purification Methods, vol. 27, pp. 51–168, (1998).

Claudia Staudt–Bickel and William J. Koros, "Improvement of $CO_2/CH_4$ Separation Characteristics of Polyimides by Chemical Crosslinking," Journal of Membrane Science, vol. 155, pp. 145–154, (1999).

Y. Liu, C. Pan, M. Ding, and J. Xu, "Effect of Crosslinking Distribution on Gas Permeability and Permselectivity of Crosslinked Polyimides," European Polymer Journal, vol. 35, pp. 1739–1741, (1999).

William J. Koros and Rajiv Mahajan, "Pushing the Limits of Possibilities for Large Scale Gas Separation: Which Strategies?," Journal of Membranes Science, vol. 175, pp. 181–196, (2000).

Rajiv Mahajan and William Koros, "Mixed Matrix Membrane Materials with Glassy Polymers, Part 2," Polymer Engineering and Science, vol. 42, No. 7, pp. 1432–1441, Jul. 2002.

* cited by examiner

*Primary Examiner*—Robert H. Spitzer
(74) *Attorney, Agent, or Firm*—Samuel L. Borkowsky

(57) ABSTRACT

A cross-linked, supported polybenzimidazole membrane for gas separation is prepared by layering a solution of polybenzimidazole (PBI) and α,α'dibromo-p-xylene onto a porous support and evaporating solvent. A supported membrane of cross-linked poly-2,2'-(m-phenylene)-5,5'-bibenzimidazole unexpectedly exhibits an enhanced gas permeability compared to the non-cross linked analog at temperatures over 265° C.

21 Claims, 4 Drawing Sheets

CROSS-LINKED POLYBENZIMIDAZOLE MEMBRANE FOR GAS SEPARATION

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to gas separation and more particularly to a cross-linked polybenzimidazole membrane used for gas separation.

BACKGROUND OF THE INVENTION

The last decade has seen a dramatic increase in the use of polymer membranes as effective, economical and flexible tools for many gas separations. The processability, gas solubility, and selectivity of several classes of polymers (such as polyimides, polysulfones, polyesters, and the like) have led to their use in a number of successful gas separation applications. A drawback to the use of polymer membranes for gas separation can be their low permeability or inadequate selectivity. In most instances, the success of a given membrane rests on achieving an appropriate combination of adequate permeability and selectivity.

Polymer membranes can be used for air separation, for the recovery of hydrogen from mixtures of nitrogen, carbon monoxide and methane, and for the removal of carbon dioxide from natural gas. For these applications, glassy polymer membranes provide high fluxes and excellent selectivities based on size differences of the gas molecules being separated.

Separation of carbon dioxide ($CO_2$) from mixed gas streams is of major industrial interest. Current separation technologies require cooling of the process gas to ambient temperatures. Significant economic benefit could be realized if these separations are performed at elevated temperatures (greater than 150° C.). Consequently, much effort is directed at identifying and developing polymers that are chemically and mechanically stable at elevated temperatures and high pressures. Linear polybenzimidazole is an example of such a polymer. Representative patents and papers that describe membranes of linear polybenzimidazole include U.S. Pat. No. 2,895,948 to K. C. Brinker et al. entitled "Polybenzimidazoles," which issued Jul. 21, 1959; RE 26,065 entitled "Polybenzimidazoles and Their Preparation," which reissued to C. S. Marvel et al. on Jul. 19,1966; "Polybenzimidazoles, New Thermally Stable Polymers," H. Vogel et al., J. Poly. Sci., vol. L., pp. 511–539, 1961; "Polybenzimidazoles II," H. Vogel et al., J. Poly. Sci. Part A, vol. 1, pp. 1531–1541, 1963; U.S. Pat. No. 3,699,038 to A. A. Boom entitled "Production of Improved Semipermeable Polybenzimidazole Membranes, which issued Oct. 17, 1972; U.S. Pat. No. 3,720,607 to W. C. Brinegar entitled "Reverse Osmosis Process Employing Polybenzimidazole Membranes," which issued Mar. 13, 1973; U.S. Pat. No. 3,737,042 entitled "Production of Improved Semipermeable Polybenzimidazole Membranes," which issued to W. C. Brinegar on Jun. 5, 1973; and U.S. Pat. No. 4,933,083 entitled "Polybenzimidazole Thin Film Composite Membranes," which issued to R. Sidney Jones Jr. on Jun. 12, 1990, all of which are incorporated by reference herein. These patents and papers show that, for years, polybenzimidazole membranes have been useful for liquid phase separations such as reverse osmosis separations, ion exchange separations, and ultrafiltration.

Polybenzimidazole is also useful for gas separations. In U.S. patent application Ser. No. 09/826,484 to Robert C. Dye et al. entitled "Meniscus Membranes for Separations," for example, meniscus-shaped polybenzimidazole supported on a stainless steel substrate was useful for separating $H_2$ from an $H_2/CO_2$ mixture, and $CO_2$ from a $CO_2/CH_4$ mixture, and that membrane performance improves as the temperature increases from 25° C. to 250° C.

The mechanical properties of polybenzimidazole may be improved by cross-linking (see, for example, U.S. Pat. No. 4,020,142 to Howard J. Davis et al. entitled "Chemical Modification of Polybenzimidazole Semipermeable Membranes," which issued Apr. 26, 1977). According to the '142 patent, cross-linked polybenzimidazole is tougher than non-cross-linked analogs and shows improved compaction resistance during prolonged usage at higher pressures. While cross-linked polybenzimidazole has been shown to be useful for liquid separations (separations in acid waste streams, reverse osmosis separations, ion exchange separations, and ultrafiltration separations), there are no reports related to gas separation using cross-linked polybenzimidazole.

Accordingly, an object of the present invention is to provide a method for separating gases using cross-linked polybenzimidazole.

Another object of the invention is to provide a cross-linked polybenzimidazole membrane for gas separation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes the polymeric, cross-linked reaction product of a polybenzimidazole and 1,4-$C_6H_4XY$, where X and Y are selected from $CH_2Cl$, $CH_2Br$, and $CH_2I$. Preferably, the polymeric reaction product is supported on a porous metallic support.

The invention also includes a cross-linked membrane prepared by layering a solution of solvent, polybenzimidazole and 1,4-$C_6H_4XY$, wherein X and Y are selected from the group consisting of $CH_2Cl$, $CH_2Br$, and $CH_2I$, on a porous support and evaporating the solvent.

The invention also includes a method for gas separation. The method includes sending a gas mixture through a membrane of cross-linked polybenzimidazole. A preferred cross-linked polybenzimidazole is the cross-linked, polymeric reaction product of poly-2,2'-(m-phenylene)-5, 5'bibenzimidazole and 1,4-$C_6H_4XY$, where X and Y are selected from $CH_2Cl$, $CH_2Br$, and $CH_2I$. Preferably, the cross-linked polybenzimidazole is supported on a porous metallic support.

The invention also includes a method for separating carbon dioxide from a gas mixture. The method involves sending a gas mixture that contains carbon dioxide through a membrane of cross-linked polybenzimidazole. Preferably, the cross-linked polybenzimidazole is on a porous metallic support.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

Figure 1:
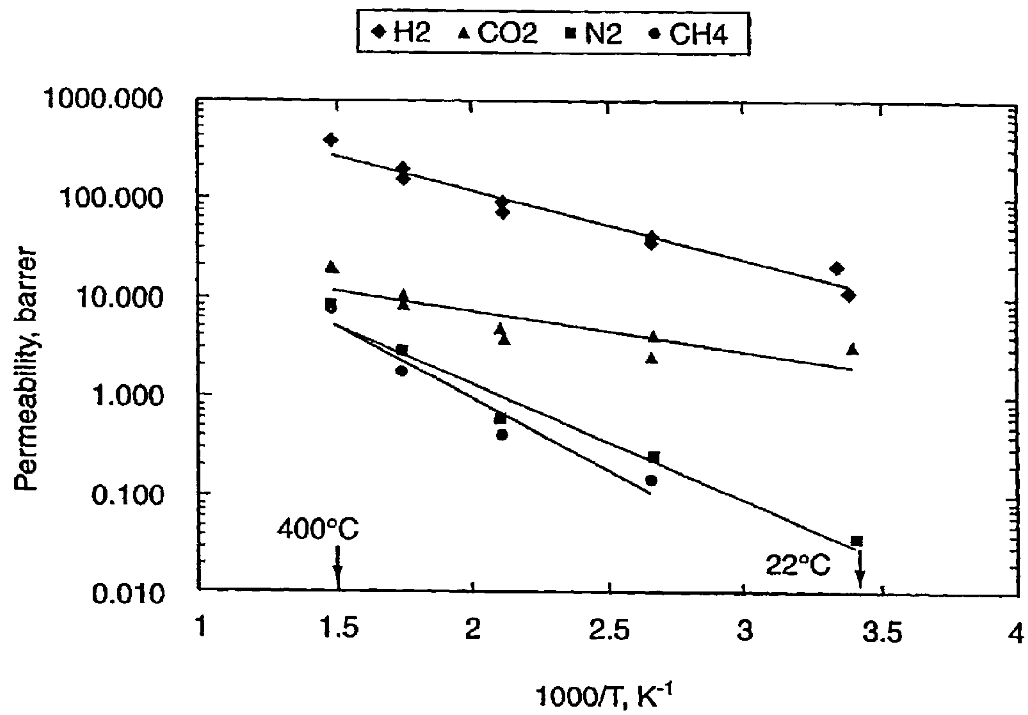
FIG. 1 provides a graph of the gas permeability of supported, linear poly-2,2'-(m-phenylene)-5, 5'bibenzimidazole membrane for $H_2$, $N_2$, $CO_2$, and $CH_4$ as a function of temperature.

The present invention includes a supported, cross-linked polybenzimidazole membrane and a method of using the membrane for gas separation. An invention membrane may be prepared by preparing a solution of a linear polybenzimidazole and cross-linking agent, casting a layer of the solution onto a porous support, evaporating the solvent to form a supported film, and heat cycling the film.

Linear polybenzimidazoles that contain reactive hydrogen atoms on the imidazole rings may be used to prepare a membrane of the invention. These reactive hydrogen atoms combine with atoms of the cross-linking agent to form molecules that are subsequently released during evaporation of the solvent and/or during heat cycling. Examples of linear polybenzimidazoles that contain reactive hydrogens on the imidazole rings include the following:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2'-2"-(m-phenylene)-5',5"-(di(benzimidazole)propane-2,2;
and poly-2',2"-(m-phenylene)-5',5"-di(benzimidazole) ethylene-1,2 where the double bonds of the ethylene are intact in the final polymer.

The preferred polybenzimidazole for use with the present invention is one prepared from poly-2,2'-(m-phenylene)-5, 5'-bibenzimidazole (see EXAMPLE). The porous substrate used with the invention can be a porous metal or porous ceramic substrate. An example of a suitable substrate is a commercially available ceramic substrate made from silicon carbide. A preferred substrate can be formed from a porous metal medium such as sintered porous stainless steel. Such a porous metal medium is available from Pall Corporation of East Hills, N.Y. under the trade names PSS (a sintered stainless steel powder metal medium), PMM (a porous sintered metal membrane including metal particles sintered to a foraminate support), PMF (a porous sintered fiber mesh medium), Rigimesh (a sintered woven wire mesh medium), Supramesh (stainless steel powder sintered to a Rigimesh support), PMF II (a porous sintered fiber metal medium), and combinations of more than one of these materials. A sintered metal medium for use in the present invention may be formed from any of a variety of metal materials including alloys of various metals such as chromium, copper, molybdenum, tungsten, zinc, tin, gold, silver, platinum, aluminum, cobalt, iron, and magnesium, as well as combinations of metals and alloys, including boron-containing alloys. Brass, bronze, and nickel/chromium alloys, such as stainless steels, the Hastelloys, the Monels and the Inconels, as well as a 50-weight percent chromium alloy, may also be used. Substrates may include nickel and alloys of nickel, although it is believed that nickel may react with and degrade the supported polymer, which would affect the longevity of the invention membrane. Examples of other suitable high temperature substrates include those formed of glass fibers.

A working embodiment of the present invention was prepared by casting a solution containing poly-2,2'-(m-phenylene)-5,5'bibenzimidazole (Celanese, $\overline{M}_n=20\times10^3$) and $1,4\text{-}C_6H_4(CH_2Br)_2$ (commonly referred to as α,α' dibromo-p-xylene) in dimethylacetamide onto a porous stainless steel substrate. The solution is typically 10 to 15 weight percent polybenzimidazole in dimethylacetamide and an amount of the $1,4\text{-}C_6H_4(CH_2Br)_2$ to give the crosslinking density of interest. The following EXAMPLE provides a procedure for preparing an invention membrane with 20 weight percent cross-linking agent.

EXAMPLE

Ten grams of a membrane casting solution containing 20 weight percent (wt %) of a cross-linking agent was prepared by dissolving 0.8 gram of poly-2,2'-(m-phenylene)-5, 5'bibenzimidazole (CELANESE CORPORATION, $\overline{M}_n=20\times10^3$, 0.78 μm-diameter) and 0.2 gram of $1,4\text{-}C_6H_4(CH_2Br)_2$ in 9 grams of N,N-dimethylacetamide. A 40 μl aliquot of the solution was evenly spread on a stainless steel substrate (PALL CORPORATION). After drying at room temperature for 15 min, the resulting supported polymer film was heated to 50° C. for 60 minutes to allow more complete solvent evaporation. The membrane was heat-cycled between 50 and 300° C. (90-min cycle time) a total of five times to enhance stability, resulting in a fully dense supported cross-linked polybenzimidazole membrane. The chemical reaction is illustrated below.

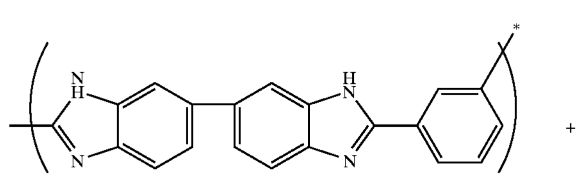

-continued

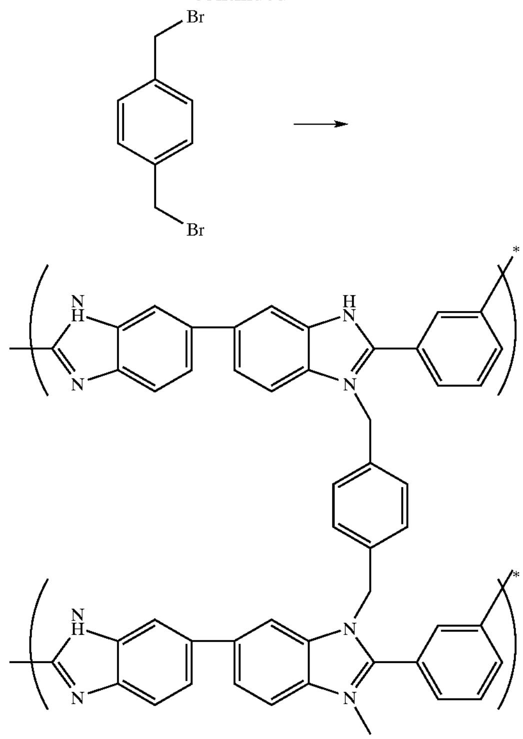

It should be understood that the polymer membranes prepared from solutions that contain other solvents, and greater and lesser amounts of the cross-linking agent also fall within the scope of the invention. Any solvent capable of dissolving polybenzimidazole, such as N,N-dimethylacetamide, N,N-dimethylformamide or N-vinylpyrrolidone, can be used with the invention. The weight percent of cross-linker can vary from nearly 0% to about 45%, but preferably the amount of cross-linker used is from about 0.1 wt % to about 20 wt %, based on the weight of the polybenzimidazole.

In order to demonstrate advantages of the cross-linked polymer membrane for gas separation, polymer membranes of unmodified linear poly-2,2'-(m-phenylene)-5,5'bibenzimidazole (CELANESE, $\overline{M}_n$=20×$10_3$, 0.78 $\mu$m-diameter) were also prepared. The procedure used for preparing unmodified polybenzimidazole membranes followed that as described for the cross-linked membrane with the exception that the cross-linking agent was omitted. Two specific comparison membranes were prepared from a solution of 10 weight percent poly-2,2'-(m-phenylene)-5,5'bibenzimidazole and 90 weight percent dimethylacetamide. A 40-$\mu$L aliquot of the solution was evenly spread on one substrate and spin coated on another, the substrates used being of the same type of stainless steel substrate as was used to prepare the supported cross-linked polymer membrane of the invention described previously. Each was dried at room temperature for 15 min, and the resulting supported polymer films were heated to 50° C. for 60 min to allow more complete solvent evaporation. Each was heat cycled between 50 and 300° C. (90-min cycle time) a total of five times to enhance stability, as described for the cross-linked membrane, which resulted in fully dense supported polybenzimidazole membranes.

The gas permeability and gas selectivity of the supported cross-linked polybenzimidazole membrane was determined and compared to that for the analogous, unmodified, linear polybenzimidazole membrane using permeate pressure-rise measurements over a wide temperature range. Gas permeability is defined herein according to equation 1 below:

$$P = \frac{(10^{10})(v)(L)}{(A)(\Delta p)} \tag{1}$$

where v is the gas flux in cubic centimeters per second ($cm^3/s$), L is the membrane thickness in cm, A is the membrane area in $cm^2$, and Δp is the pressure difference across the membrane in cm Hg.

Gas selectivity, $\alpha_{A/B}$, is defined herein as the ratio of the permeability of gas A divided by the permeability of gas B.

The practice of the invention can be further understood with the accompanying figures. The permeability results are presented in FIG. 1 and FIG. 2; the selectivity results are presented in FIG. 3 and FIG. 4.

Figure 2:
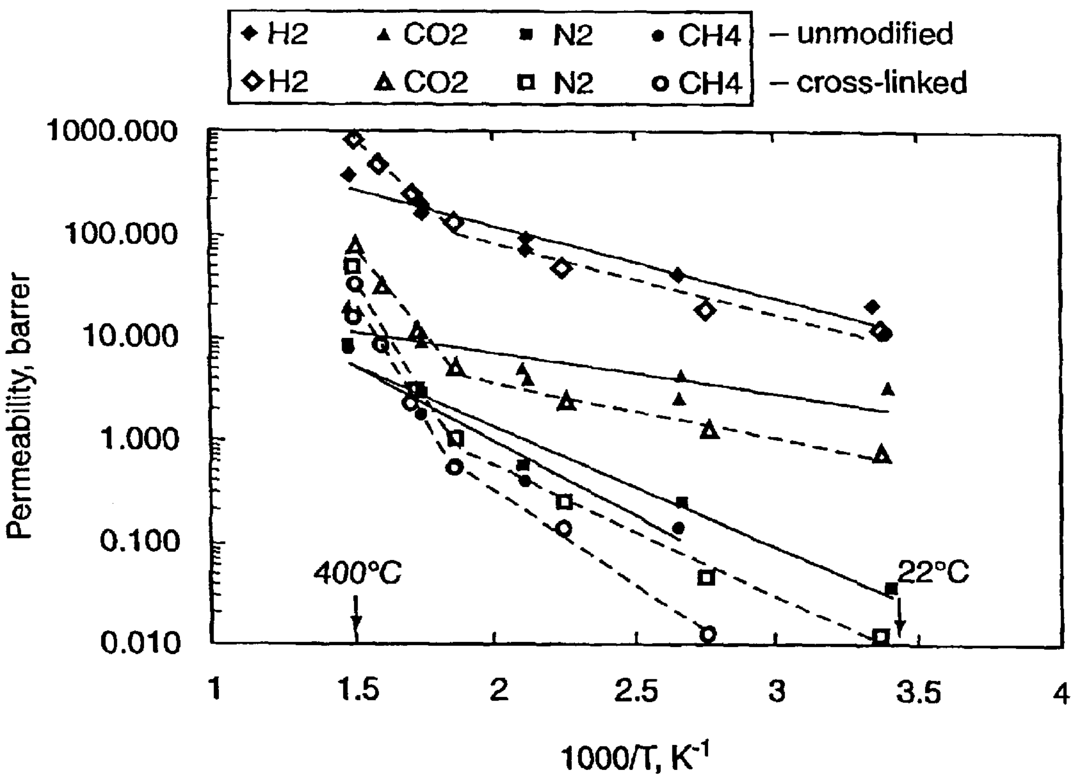
FIG. 2 provides a graph comparing the gas permeability of the linear membrane of FIG. 1 with that for a supported cross-linked polybenzimidazole of the invention prepared by reacting poly-2,2'-(m-phenylene)-5,5'bibenzimidazole with 20 weight percent of α,α'-dibromo-p-xylene.

Turning now to the Figures, FIG. 1 includes a graph of the permeability of the supported, linear poly-2,2'-(m-phenylene)-5,5'bibenzimidazole membrane as a function of temperature. FIG. 2 shows a graphical comparison of the permeabilities of unmodified and cross-linked poly-2,2'-(m-phenylene)-5,5'bibenzimidazole supported membranes prepared according to EXAMPLE 2 using 20 wt. % α,α' dibromo-p-xylene. The data used for the graphs of FIG. 1 and FIG. 2 are shown in Table 1 below.

TABLE 1

| | Cross-linked PBI | | Unmodified, linear PBI | |
|---|---|---|---|---|
| | Temperature, ° C. | Permeability, barrer | Temperature, ° C. | Permeability, barrer |
| $H_2$ | 23 | 11.187 | 17 | 5.117 |
| | 89 | 18.19025 | 95 | 19.221 |
| | 172 | 46.308774 | 160 | 33.845 |
| | 265 | 130.20696 | 223 | 73.057 |
| | 310 | 246.70353 | 313 | 165.76299 |
| | 354 | 474.62528 | 315 | 171.1804 |
| | 354 | 467.8280 | 279 | 125.53064 |
| | 392 | 830.76268 | 181 | 50.376722 |
| | | | 121 | 23.689705 |
| | | | 24 | 4.7438374 |
| | | | 373 | 263.25309 |
| $N_2$ | 23 | 0.0110432 | 21 | 0.0258826 |
| | 89 | 0.0448806 | 95 | 0.077025 |
| | 170 | 0.2374782 | 156 | 0.2030286 |
| | 261 | 0.9886606 | 216 | 0.7087747 |
| | 307 | 3.0027303 | 313 | 2.2544598 |
| | 351 | 9.0347393 | 313 | 2.1886325 |
| | 389 | 47.402361 | 279 | 1.2166992 |
| | | | 181 | 0.2586471 |
| | | | 121 | 0.0670755 |
| | | | 23 | 0.0169855 |
| | | | 369 | 4.0848769 |
| $CO_2$ | 23 | 0.6988431 | 313 | 7.6339218 |
| | 88 | 1.1853599 | 313 | 7.5653723 |
| | 170 | 2.2604367 | 279 | 5.3973399 |
| | 262 | 4.9899 | 181 | 2.1226676 |
| | 307 | 11.0751 | 121 | 1.1005387 |
| | 350 | 29.768305 | 23 | 0.3071448 |
| | 389 | 78.325774 | 369 | 11.299329 |
| $CH_4$ | 89 | 0.0116948 | 315 | 1.68119 |
| | 171 | 0.1347 | 313 | 1.6964713 |
| | 263 | 0.5313097 | 279 | 0.9569662 |
| | 309 | 2.1446 | 181 | 0.1534 |
| | 352 | 7.8489529 | 121 | 0.0093627 |
| | 391 | 15.3470 | 370 | 4.5872553 |
| | 390 | 31.684424 | | |

As Table 1, and FIGS. 1 and 2 show, gas permeability was performed over a wide temperature range from about 20° C. to about 400° C. The graph of FIG. 1 shows that the order of gas permeability for this membrane is $H_2$>$CO_2$>$N_2$>$CH_4$.

This is the order generally observed for other gas-permeable glassy membranes. This response of the membrane permeability with increasing temperature is typical of polymer membranes due to the increased motion of the polymer chains, resulting in a loss of size selectivity.

FIG. 2 includes data points for the cross-linked polymer membrane as open symbols with dashed trend lines, while data points for the non-cross-linked membrane are shown as closed symbols with solid trend lines. The symbols are as follows: diamond ($H_2$); square ($N_2$); triangle ($CO_2$); and circle ($CH_4$). As FIG. 2 shows, trend lines plotted from data for the non-cross linked polymer membrane have a decreased slope for $H_2$ and $CO_2$ and an increased slope for $N_2$ and $CH_4$ as compared to the trend lines plotted for the cross-linked polymer membrane of the invention. All trend lines indicate a reduced permeability for each gas for the cross-linked polymer membrane at temperatures below about 265° C. Unexpectedly, at temperatures above 265° C., the cross-linked polymer membrane displayed a significant improvement in permeability for all gases compared to the non-cross-linked polymer.

Figure 3:
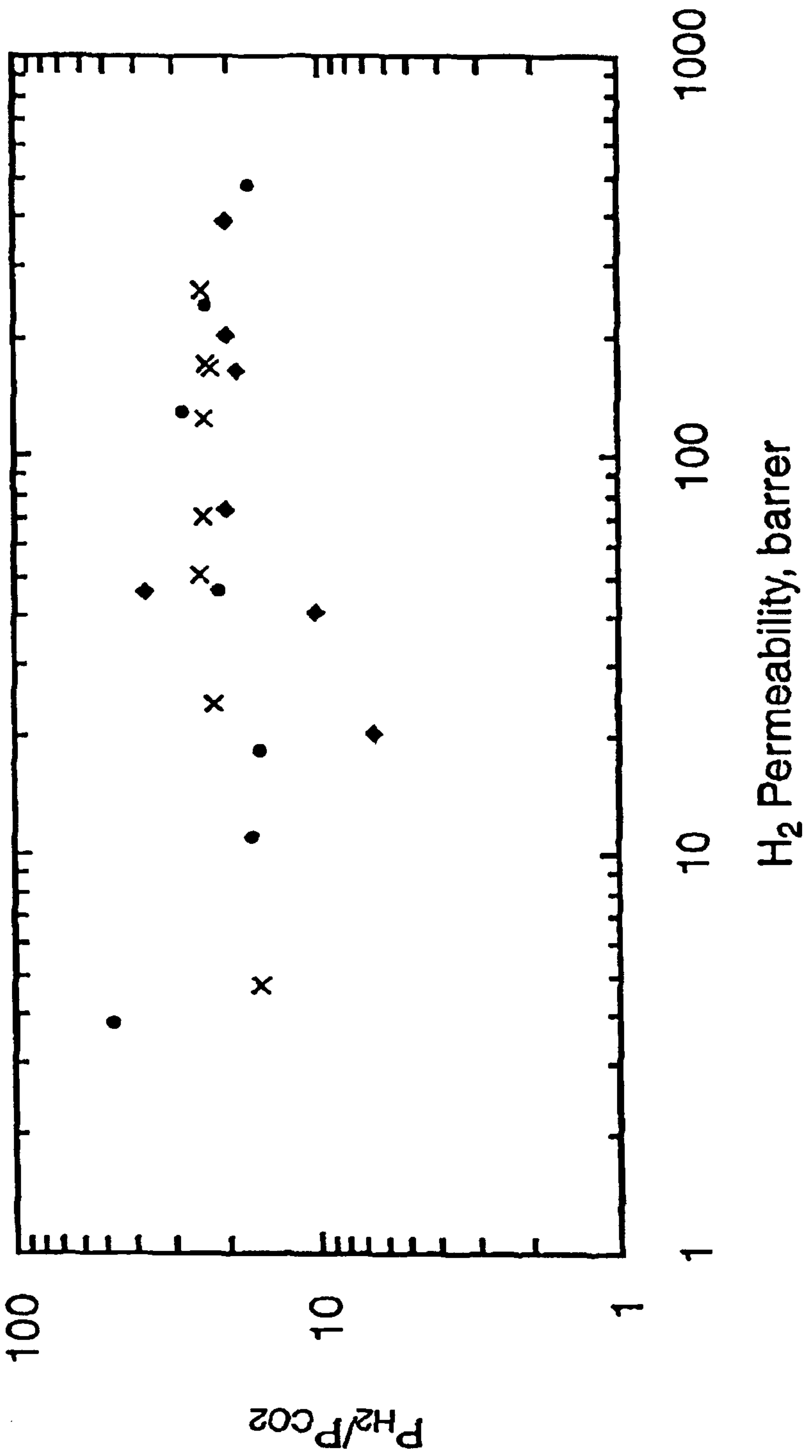
FIG. 3 provides a graph that compares the $H_2/CO_2$ selectivity versus $H_2$ permeability of supported, linear poly-2,2'-(m-phenylene)-5,5'bibenzimidazole membranes, one spread evenly (x) and the other spin-coated (•)) with the permeability of the invention cross-linked membrane of FIG. 2 (♦)

FIG. 3 includes a graph that compares the $H_2/CO_2$ selectivity versus $H_2$ permeability of unmodified, linear poly-2,2'-(m-phenylene)-5,5'-bibenzimidazole with cross-linked poly-2,2'-(m-phenylene)-5,5'-bibenzimidazole of the invention. The graph includes data plotted for two supported, unmodified linear poly-2,2'-(m-phenylene)-5,5'-bibenzimidazole membranes, one where polymer was spread evenly on the support ('x' symbols) and the other where polymer was spin coated on the support (• symbols). Data for the cross-linked poly-2,2'-(m-phenylene)-5,5'-bibenzimidazole is shown with diamond symbols. According to FIG. 3, there appears to be no difference in selectivity between the two membranes prepared from unmodified polymer. Interestingly, there is a slight increase in $H_2/CO_2$ selectivity with increasing hydrogen permeability for the cross-linked membrane.

Cross-linking a membrane generally tends to improve selectivity but decrease permeability. For the membrane of the invention, neither selectivity nor permeability appears to be adversely affected by the cross-linking, and the toughness of the polymer membrane is improved.

Figure 4:
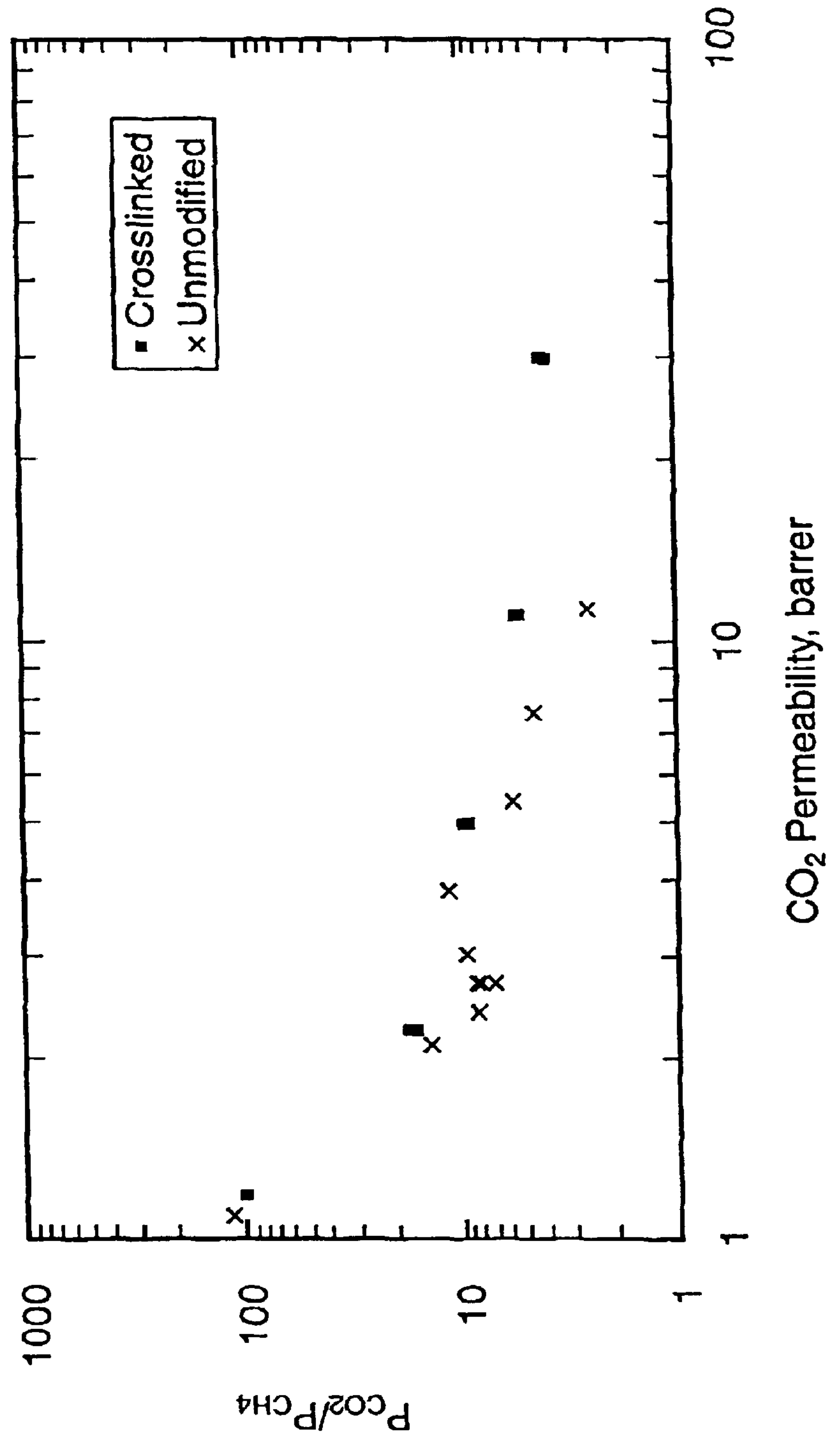
FIG. 4 provides a graph that compares the $CO_2/CH_4$ selectivity versus $CO_2$ permeability of the linear and cross-linked membranes of FIG. 2.

FIG. 4 includes a graph of $CO_2/CH_4$ selectivity as a function of $CO_2$ permeability for the linear membrane (x) and the cross-linked membrane (solid square). Interestingly, the $CO_2/CH_4$ methane selectivity does not decrease as dramatically for the supported, cross-linked membrane as for the unmodified supported membrane. It is believed that cross-linking reduces the mobility of the membrane polymer chains, which, in turn maintains the selectivity.

In summary, the invention includes a cross-linked polybenzimidazole membrane for gas separation. Gas mixtures that include gases such as hydrogen sulfide, $SO_2$, COS, carbon monoxide, carbon dioxide, nitrogen, hydrogen, and methane can be separated using the invention membrane. An embodiment of the cross-linked polybenzimidazole membrane and the analogous unmodified linear polybenzimidazole membrane were prepared and the gas permeability and selectivities of the membranes were compared. The cross-linked membrane unexpectedly exhibits enhanced gas permeability at elevated temperatures over 265° C. Gas permeability and selectivity results indicate that the cross-linked membrane of the invention are useful for separating carbon dioxide from mixed gas streams, preferably at elevated temperatures.

The foregoing description of the invention has been presented for purposes of illustration and description and is not intended to be exhaustive or to limit the invention to the precise form disclosed, and obviously many modifications and variations are possible in light of the above teaching. For example, while poly-2,2'-(m-phenylene)-5,5'-bibenzimidazole and 1,4-$C_6H_4(CH_2Br)_2$ were used for cross-linked membranes of the invention, it should be understood that other linear polybenzimidazoles that contain reactive hydrogen atoms, and cross-linking agents that contain chlorine and/or iodine instead of bromine can also be used.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for gas separation, comprising sending a gas mixture through a membrane comprising cross-linked polybenzimidazole.

2. The method of claim 1, wherein the cross-linked polybenzimidazole is formed by reacting a polybenzimidazole with 1,4-$C_6H_4XY$, wherein X and Y are selected from the group consisting of $CH_2Cl$, $CH_2Br$, and $CH_2I$.

3. The method of claim 1, wherein the polybenzimidazole comprises poly-2,2'-(m-phenylene)-5,5'-bibenzimidazole.

4. The method of claim 3, wherein the membrane is heated to a temperature of at least 265° C.

5. The method of claim 1, wherein the membrane further comprises a porous support comprising a material selected from the group consisting of metals, metal alloys, ceramic materials, and combinations thereof.

6. The method of claim 1, wherein the gas mixture comprises at least one gas selected from the group consisting of hydrogen sulfide, $SO_2$, COS, carbon monoxide, carbon dioxide, nitrogen, hydrogen, and methane.

7. The method of claim 1, wherein the membrane is heated to a temperature from about 25° C. to about 400° C.

8. A method for separating carbon dioxide from a gas mixture, comprising sending a gas mixture that includes carbon dioxide through a membrane comprising cross-linked polybenzimidazole.

9. The method of claim 8, wherein cross-linked polybenzimidazole comprises a cross-linked, polymeric reaction product of polybenzimidazole with 1,4-$C_6H_4XY$, wherein X and Y are selected from the group consisting of $CH_2Cl$, $CH_2Br$, and $CH_2I$.

10. The method of claim 8, wherein the membrane further comprises a porous support comprising a material selected from the group consisting of metals, metal alloys, ceramic materials, and combinations thereof.

11. The method of claim 8, wherein the gas mixture comprises at least one hydrocarbon.

12. The method of claim 8, wherein the gas mixture comprises methane.

13. The method of claim 8, further comprising heating the membrane to a temperature from about 25° C. to about 400° C.

14. The method of claim 8, wherein the cross-linked polybenzimidazole comprises the reaction product of poly-2,2'-(m-phenylene)-5,5'-bibenzimidazole and 1,4-$C_6H_4X_2$ wherein X is $CH_2Br$.

15. The method of claim 14, wherein the membrane is heated to a temperature of at least 265° C.

16. A membrane comprising a cross-linked, polymeric reaction product of a polybenzimidazole and 1,4-$C_6H_4XY$, wherein X and Y are selected from the group consisting of $CH_2Cl$, $CH_2Br$, and $CH_2I$.

17. The membrane of claim 16, wherein X and Y are $CH_2Br$.

18. The membrane of claim 16, further comprising a porous support for supporting said cross-linked polymeric reaction product, wherein said porous support comprises a material selected from the group consisting of metal, metal alloy, ceramic material, and combinations thereof.

19. The membrane of claim 16, wherein said polybenzimidazole comprises poly-2,2'-(m-phenylene-5, 5'bibenzimidazole).

20. A cross-linked membrane prepared by layering a solution of solvent, polybenzimidazole and 1,4-$C_6H_4XY$, wherein X and Y are selected from the group consisting of $CH_2Cl$, $CH_2Br$, and $CH_2I$, on porous support and evaporating the solvent.

21. The membrane of claim 20, wherein the solution comprises 1,4-$C_6H_4XY$ in an amount from greater than zero weight percent to about 45 weight percent based on the weight of polybenzimidazole.

* * * * *